US011650366B2

(12) United States Patent
Adachi

(10) Patent No.: US 11,650,366 B2
(45) Date of Patent: May 16, 2023

(54) PLANAR ILLUMINATION DEVICE INCLUDING A PILLAR AND AN ELASTIC MEMBER

(71) Applicant: MINEBEA MITSUMI Inc., Nagano (JP)

(72) Inventor: Kazumasa Adachi, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/653,372

(22) Filed: Mar. 3, 2022

(65) Prior Publication Data
US 2022/0283361 A1    Sep. 8, 2022

(30) Foreign Application Priority Data

Mar. 8, 2021    (JP) .............................. JP2021-036327

(51) Int. Cl.
*F21V 8/00*    (2006.01)

(52) U.S. Cl.
CPC ......... *G02B 6/0088* (2013.01); *G02B 6/0091* (2013.01)

(58) Field of Classification Search
CPC .............................. G02B 6/0088; G02B 6/0091
See application file for complete search history.

(56) References Cited

U.S. PATENT DOCUMENTS

| 2010/0296021 A1* | 11/2010 | Jung .................... G02B 6/0088 362/97.1 |
| 2012/0287670 A1* | 11/2012 | Ishizaka ............... G02B 6/0088 362/616 |
| 2013/0135901 A1* | 5/2013 | Ishimoto ........... G02F 1/133308 362/617 |

(Continued)

FOREIGN PATENT DOCUMENTS

| JP | 2011-222331 A | 11/2011 |
| JP | 2012-084304 A | 4/2012 |
| JP | 2015-176752 A | 10/2015 |

OTHER PUBLICATIONS

Jiantong et al. "Research on the factors affecting warpage of the light guide plate in the process of reliability," 2022 IEEE International Symposium on the Physical and Failure Analysis of Integrated Circuits (IPFA), 2022, pp. 1-5, doi: 10.1109/IPFA55383.202 (Year: 2022).*

*Primary Examiner* — Keith G. Delahoussaye
(74) *Attorney, Agent, or Firm* — Pearne & Gordon LLP

(57) ABSTRACT

A planar illumination device of an embodiment includes a light guide plate, a plurality of light sources, an elastic member, and a bottom frame. The light guide plate receives light from a light incident side surface. The plurality of light sources emit light to the light incident side surface of the light guide plate. The elastic member presses and supports the light guide plate. The bottom frame houses the light guide plate, the plurality of light sources, and the elastic member. The bottom frame includes a pillar configured to (Continued)

protrude in a thickness direction at a position opposing substantially a center of the light incident side surface of the light guide plate in a longitudinal direction. The light guide plate includes, substantially at the center of the light incident side surface in the longitudinal direction, a groove configured to engage with the pillar. The elastic member presses a side of the light guide plate at a non-light incident side toward a light incident side.

15 Claims, 12 Drawing Sheets

(56) References Cited

U.S. PATENT DOCUMENTS

| | | | |
|---|---|---|---|
| 2015/0212262 A1* | 7/2015 | Chiang | G02B 6/0093 362/611 |
| 2016/0291233 A1* | 10/2016 | Trutna | G02B 6/0073 |

* cited by examiner

PLANAR ILLUMINATION DEVICE INCLUDING A PILLAR AND AN ELASTIC MEMBER

CROSS REFERENCE TO RELATED APPLICATIONS

This application claims the benefit of priority to Japanese Patent Application Number 2021-036327 filed on Mar. 8, 2021. The entire contents of the above-identified application are hereby incorporated by reference.

TECHNICAL FIELD

The present disclosure relates to a planar illumination device.

BACKGROUND

A planar illumination device known as an edge-light planar illumination device receives light from a light incident side surface of a light guide plate and emits light from one main surface of the light guide plate (for example, see JP 2011-222331 and JP 2015-176752). Such a planar illumination device is used as, for example, a backlight in a liquid crystal display device.

Since components of the planar illumination device such as the light guide plate expand and contract according to a change in temperature, a clearance is required between the light guide plate and a side wall of a bottom frame configured to house the components. When the light guide plate is simply placed, vibration acting on the planar illumination device causes the light guide plate to come into contact with the bottom frame due to the presence of the clearance. This generates a rattle noise, which is unpleasant to a user. For this reason, in typical conventional technology, a corner portion of the light guide plate at a non-light incident side is supported by an elastic member such as rubber, and the light guide plate is pressed toward the light incident side. Thus, expansion and contraction of the light guide plate according to a change in temperature is absorbed while preventing vibration.

SUMMARY

As described above, in general, the corner portion of the light guide plate at the non-light incident side is supported by the elastic member, and stable support can be achieved with a simple structure, which is preferable. However, in an enlarged planar illumination device (increased in horizontal length due to enlargement of a light incident side) for on-board applications and the like, it is difficult to adopt such a structure. In other words, a greater clearance between the side wall of the bottom frame and the light guide plate is also needed due to the increase in the horizontal length of the light guide plate, and the length of the elastic member in an expansion/contraction direction for absorbing the clearance also increases. However, since the thickness of the light guide plate is not greatly different from before, an aspect ratio of the thickness and the length of the elastic member is inverted and the elastic member in a compressed state rises and pops out. Thus, it is difficult to create a design for stably supporting the light guide plate. One possible solution is to provide the elastic member only on a side at the non-light incident side instead of at the corner portion of the light guide plate at the non-light incident side and press the light guide plate toward the light incident side. However, it is difficult to restrict movement of the light guide plate in the long-side direction, and generation of rattle noise cannot be effectively prevented.

In light of the foregoing, the present disclosure is directed at providing a planar illumination device capable of effectively preventing generation of rattle noise by support with an elastic member, even in a configuration having a long side at a light incident side.

In order to solve the problem described above and achieve the object, a planar illumination device according to an aspect of the present disclosure includes a light guide plate, a plurality of light sources, an elastic member, and a bottom frame. The light guide plate receives light from a light incident side surface. The plurality of light sources emit light to the light incident side surface of the light guide plate. The elastic member presses and supports the light guide plate. The bottom frame houses the light guide plate, the plurality of light sources, and the elastic member. The bottom frame includes a pillar configured to protrude in a thickness direction at a position opposing substantially a center of the light incident side surface of the light guide plate in a longitudinal direction. The light guide plate includes, substantially at the center of the light incident side surface in the longitudinal direction, a groove configured to engage with the pillar. The elastic member presses a side of the light guide plate at a non-light incident side toward a light incident side.

The planar illumination device according to an aspect of the present disclosure can effectively prevent generation of rattle noise by support with the elastic member, even in a configuration having a long side at the light incident side.

DESCRIPTION OF EMBODIMENTS

Figure 1:
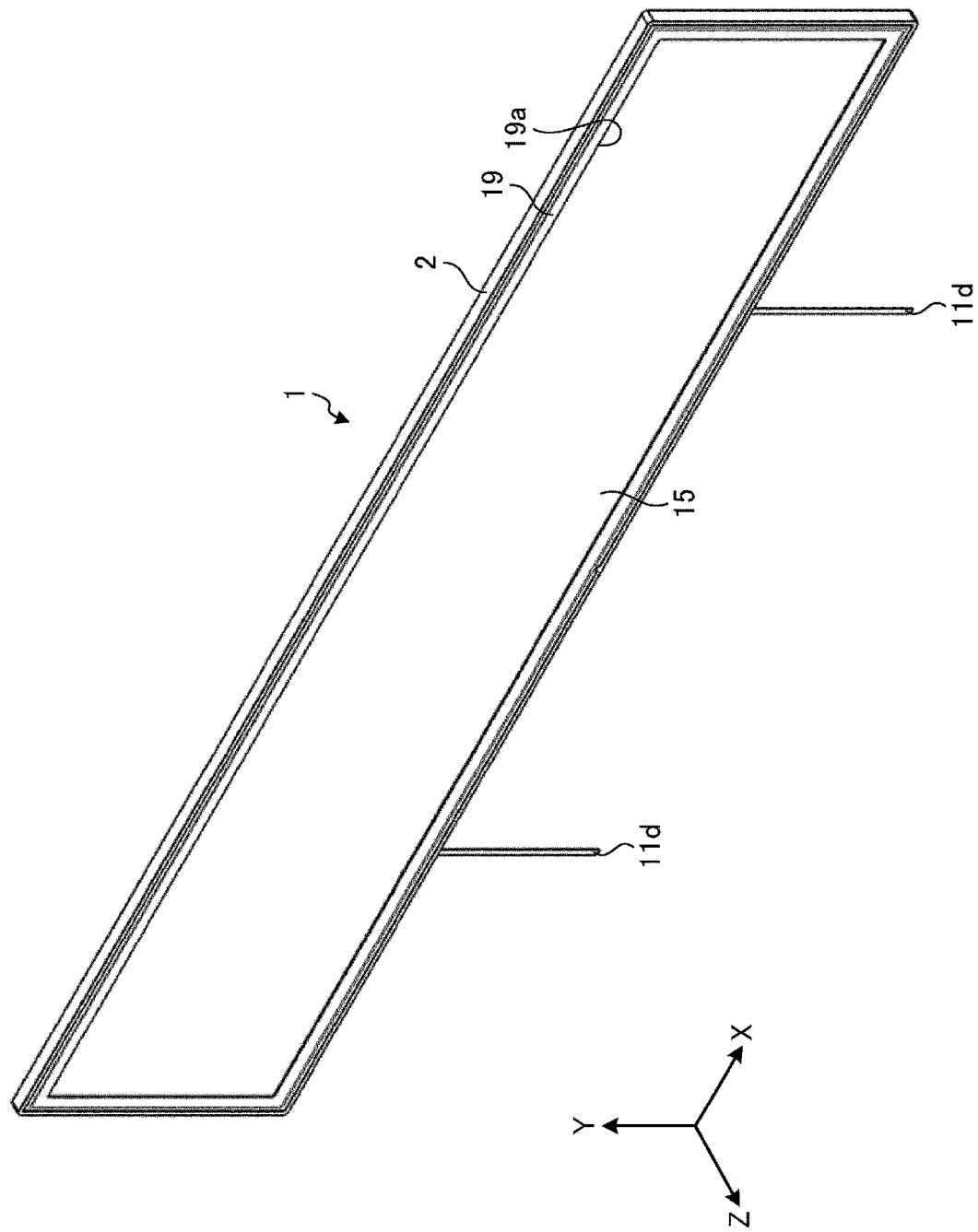
FIG. 1 is an external perspective view of a planar illumination device according to an embodiment.

A planar illumination device according to an embodiment will be described below with reference to the drawings. Note that the present disclosure is not limited to this embodiment. Further, the dimensional relationships, proportions, and the like between elements in the drawings may differ from reality. Among the drawings, portions having mutually different dimensional relationships and proportions may be included. Furthermore, the contents described in one embodiment or modified example are applied in principle to other embodiments or modified examples.

FIG. 1 is an external perspective view of a planar illumination device 1 according to an embodiment as seen from a light exit surface side. In FIG. 1, for the sake of convenience, the direction along the long side of a housing of the planar illumination device 1 is the X-axis direction, the direction along the short side of the housing is the Y-axis direction, and the direction along the thickness of the housing is the Z-axis direction.

In FIG. 1, an external shape of the planar illumination device 1 is a substantially rectangular and substantially flat plate-like shape, and a top frame 19 is exposed at an end portion at the light exit surface side. The light exit surface side is a side toward the viewer of the diagram. A bottom frame 2 is located at a rear surface side. The light exits from an opening 19a. The opening 19a is formed in the top frame 19. The opening 19a exposes an optical sheet 15 inside the top frame 19.

A connection portion 11d of a substrate 11 in the planar illumination device 1 is provided extending from the planar illumination device 1 in the negative Y-axis direction, and is used for electrical connection to the outside. The top frame 19 is formed of a resin or the like. The bottom frame 2 is formed by, for example, die casting a metal material. When the planar illumination device 1 is used as a backlight of a liquid crystal display device or the like, the liquid crystal display device or the like is mounted at the opening 19a side.

Note that while FIG. 1 illustrates a substantially flat plate-like housing, the housing may have a curved plate-like shape. In this case, in addition to the bottom frame 2 and the top frame 19, a light guide plate and other components to be described below in the planar illumination device 1 also have a curved shape.

Figure 2:
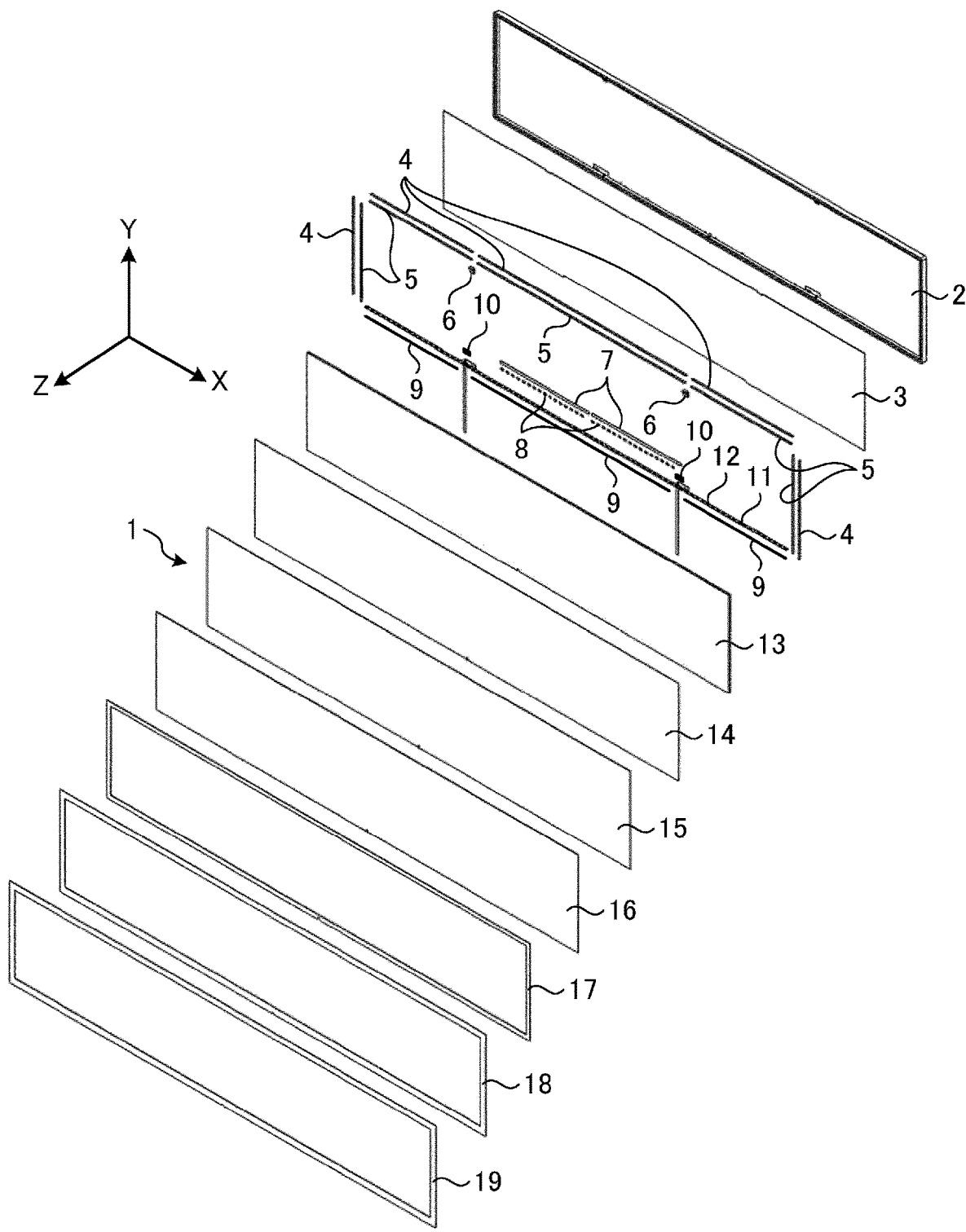
FIG. 2 is an exploded perspective view of main components of the planar illumination device.

FIG. 2 is an exploded perspective view of main components of the planar illumination device 1 as seen from the light exit surface side as in FIG. 1. In FIG. 2, the planar illumination device 1 includes a reflector 3, a spacer 5, an elastic member 6, the substrate 11, a light source 12, a light guide plate 13, optical sheets 14 to 16, a spacer 17, and the top frame 19. These components are housed in the bottom frame 2.

The bottom frame 2 has a substantially box-like shape with a bottom and without a lid, and is formed by, for example, die casting a metal material. Details of the structure of the bottom frame 2 will be described below. The reflector 3 has a substantially rectangular thin plate shape, and is placed at an inner side on a bottom portion of the bottom frame 2. A side of the reflector 3 opposing the light guide plate 13 is a reflective surface, and returns, to the light guide plate 13 side, light leaking from the light guide plate 13 to the rear side (non-light exit side) to improve light efficiency. A predetermined range from a center portion of a lower side in the diagram of the reflector 3 is cut out in order to expose double-sided tape 7 and 8 to be described below. Further, a coupling portion of the substrate 11 to be described below is directly fixed to the bottom frame 2 at the rear side of the reflector 3 (at the bottom frame 2 side).

The spacer 5 is strip-like and is fixed, via a strip-like double-sided tape 4, to the inside of a side wall of the bottom frame 2 excluding the light incident side (the side of the lower side in the drawing). The spacer 5 prevents rattle noise from being generated due to the light guide plate 13 and the optical sheets 14 to 16 coming into direct contact with the bottom frame 2, and also returns light leaking from the side surface of the light guide plate 13 and the optical sheets 14 to 16 to improve light efficiency.

The strip-like substrate 11 is fixed, via a strip-like double-sided tape 9, to the inside of the side wall of the bottom frame 2 at the light incident side. A plurality of the light sources 12, such as light emitting diodes (LED), are disposed on the substrate 11. Although details of the substrate 11 will be described below, a part of the substrate 11 is bypassed by a coupling portion 11b, and the coupling portion 11b is fixed to the inside of the bottom portion of the bottom frame 2 by a double-sided tape 10.

The light guide plate 13 has a substantially rectangular and substantially flat plate-like external shape, is formed of a transparent resin or the like, such as polycarbonate, guides light incident from the light incident side surface at a lower side in the diagram to a terminal end side, and emits the light from a main surface at the side toward the viewer of the figure by action of an optical element on a rear surface. The light guide plate 13 has a light incident side surface at the lower side in the diagram disposed opposing the light source 12 on the substrate 11. The light guide plate 13 is fixed to the inside of the bottom portion of the bottom frame 2 in a predetermined range at a substantial center of the light incident side surface in a longitudinal direction by double-sided tape 8 disposed in island shapes between the plurality of light sources 12, and the strip-like double-sided tape 7. In addition, a long side (an upper side in the diagram) of the light guide plate 13 at a non-light incident side is pressed and supported by the two elastic members 6 formed of synthetic rubber or the like, and a long side (a lower side in the diagram) at a light incident side is supported by feet protruding from the bottom frame 2. Details will be described below.

The optical sheets 14 to 16 each having a substantially rectangular shape are sequentially layered at the light exit surface side of the light guide plate 13. The optical sheet 14 is, for example, a diffuser (diffusion film). The optical sheet 15 is, for example, a prism sheet such as BEF (brightness enhancement film manufactured by 3M Japan Limited). The optical sheet 16 is, for example, a prism sheet such as DBEF (brightness enhancement film manufactured by 3M Japan Limited). At the light exit surface side of the optical sheet 16, the spacer 17 having a frame shape is placed, and the top frame 19 having a frame shape is fixed via a double-sided tape 18 having a frame shape.

Figure 3:
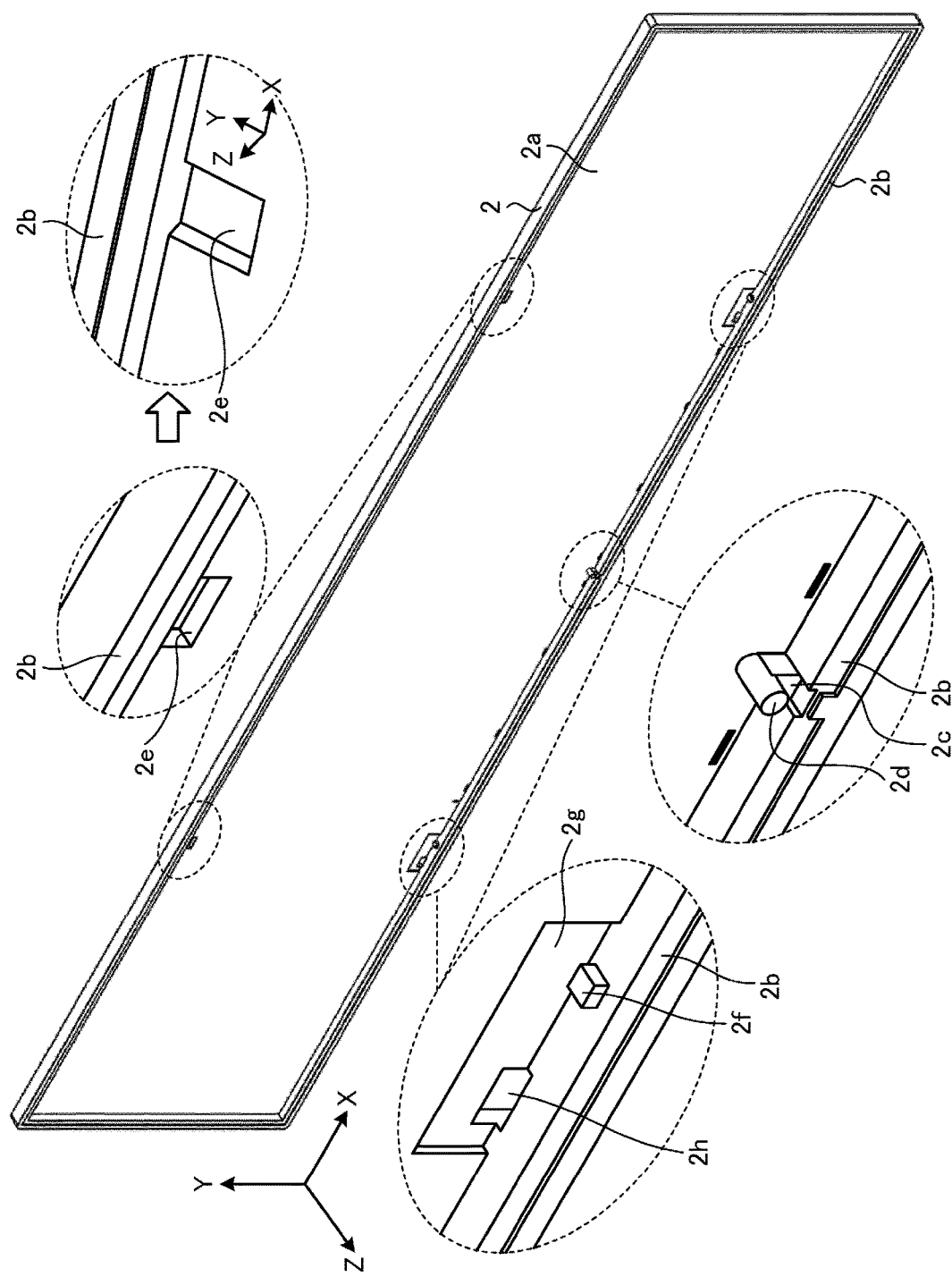
FIG. 3 is an external perspective view of a bottom frame.

FIG. 3 is an external perspective view of the bottom frame 2. In FIG. 3, the portions indicated by large dashed circles are partially enlarged views of the portions indicated by small dashed circles connected to the large dashed circles by the dashed lines. When an original coordinate axis is not illustrated, FIG. 3 uses the same coordinate axis of a basic perspective view. When an original coordinate axis is illustrated, the illustration is a view from a different angle along the coordinate axis.

In FIG. 3, the bottom frame 2 includes a bottom portion 2a, and side walls 2b surrounding four sides around the bottom portion 2a. A pillar 2c protruding in the thickness direction is provided substantially at the center of the lower side wall 2b in the diagram. The pillar 2c is connected to the side wall 2b of the bottom frame 2 at the light incident side, and protrudes in the thickness direction from the bottom portion 2a of the bottom frame 2. With this configuration, the strength of the pillar 2c can be increased, and the light guide plate 13 can be stably supported. As described below, a groove 13c formed in the light guide plate 13 at the light incident side engages with the pillar 2c to restrict movement of the light guide plate 13 in the longitudinal direction (X-axis direction).

In addition, a pin 2d provided so as to protrude in a light exit direction is provided at a light exit side of the pillar 2c. As described below, a hole formed in each of the optical sheets 14 to 16 (FIG. 2) at the light incident side engages with the pin 2d to fix the optical sheets 14 to 16. In this way, the optical sheets 14 to 16 can be easily fixed, and frame narrowing can be achieved since another region for fixing the optical sheets 14 to 16 does not need to be secured.

Further, at two positions symmetrical with respect to substantially the center of the upper side wall 2b in the diagram of the bottom frame 2, recess portions 2e configured to fit with a part of the elastic member 6 (FIG. 2) are provided in the bottom portion 2a adjacent to the side wall 2b. Further, a plurality of feet 2f protruding in a light guide direction from the inside of the side wall 2b are provided in positions of the lower side wall 2b in the drawing substantially corresponding to the upper recess portions 2e. In this way, the light guide plate 13 can be prevented from rotating like a seesaw with the pillar 2c as a fulcrum. Note that the feet 2f do not need to be located in positions corresponding to the upper recess portions 2e.

Further, a recess portion 2g having a substantially rectangular shape and housing the coupling portion 11b of the substrate 11 described below, and a hole 2h having a substantially rectangular shape and receiving insertion of the connection portion 11d drawn from the coupling portion 11b are formed near each of the feet 2f. Note that a case where the feet 2f are provided at the bottom frame 2 side is illustrated, but feet may be provided so as to protrude from the light guide plate 13 side toward the side wall 2b of the bottom frame 2.

Figure 4:
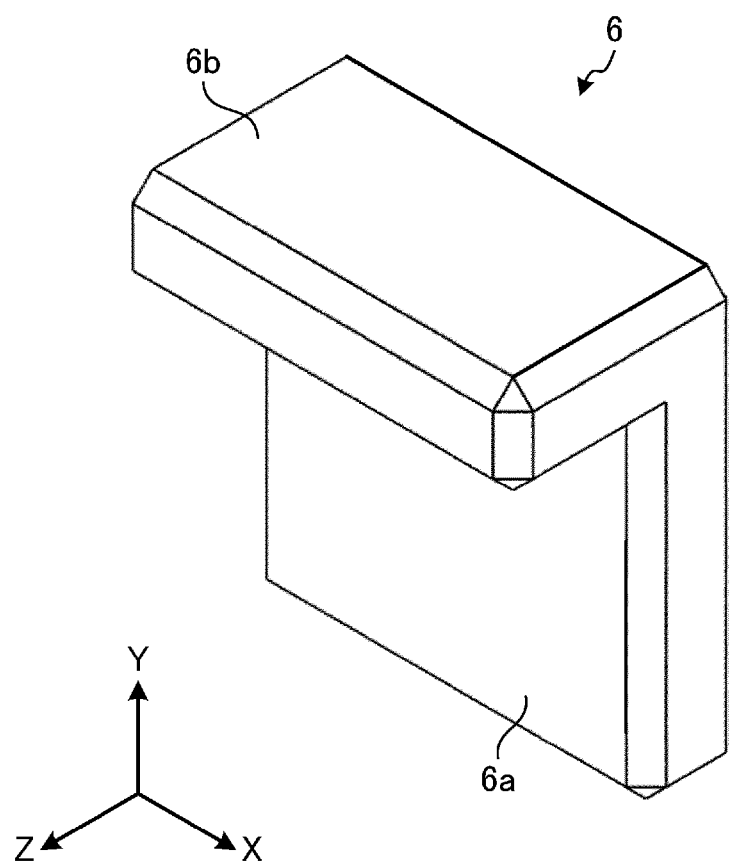
FIG. 4 is an external perspective view of an elastic member.

FIG. 4 is an external perspective view of the elastic member 6. In FIG. 4, the elastic member 6 is formed of molded rubber or the like, and includes a flat portion 6a having a substantially rectangular shape and a bent portion 6b having a substantially rectangular shape and being provided upright at a right angle from one side of the flat portion 6a. The flat portion 6a is disposed between the main surface of the light guide plate 13 at the non-light exit side and the bottom portion 2a of the bottom frame 2. The bent portion 6b is disposed between the side of the light guide plate 13 at the non-light incident side and the side wall 2b of the bottom frame 2.

Figure 5:
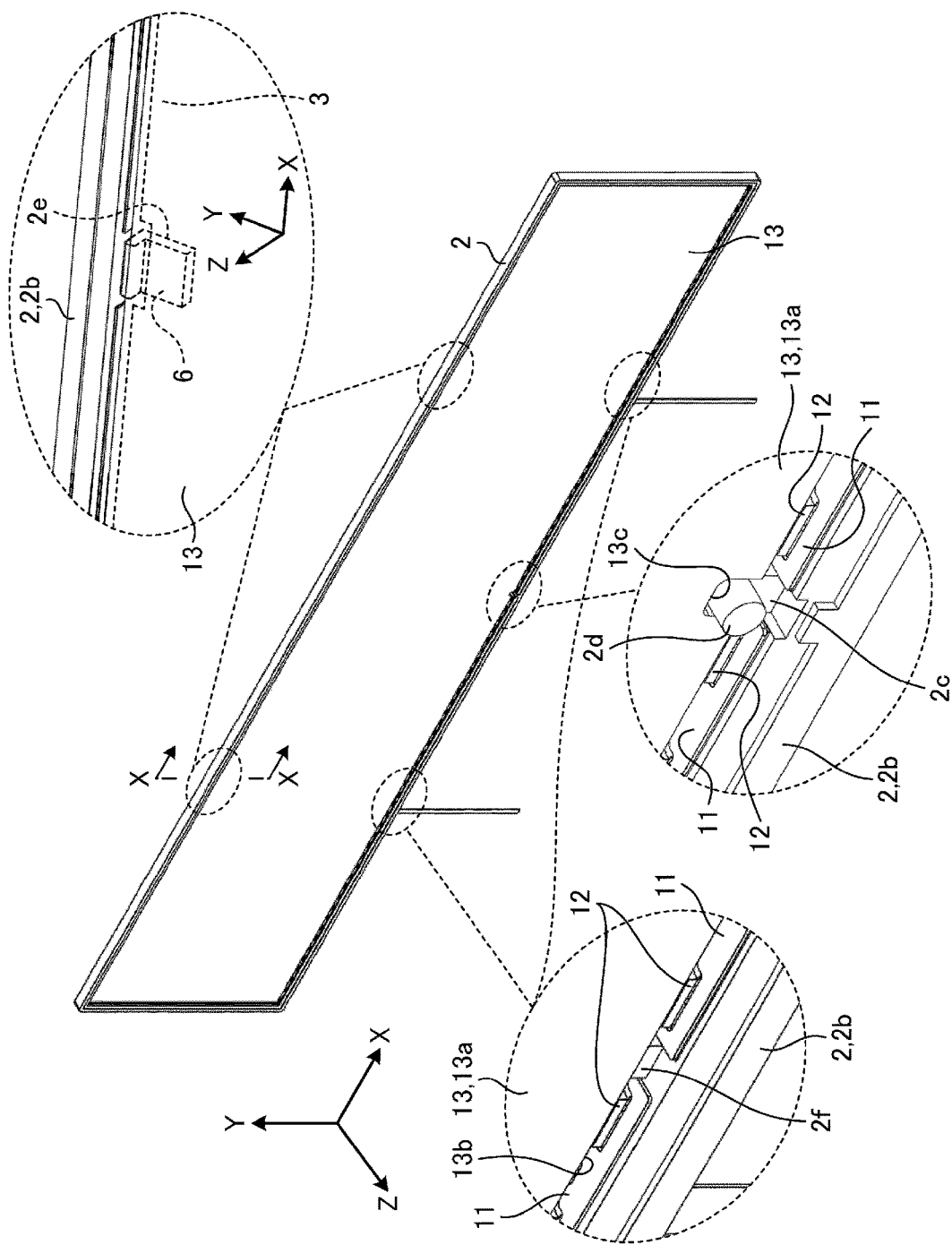
FIG. 5 is a perspective view illustrating a state of supporting a light guide plate by a pillar, the elastic member, and feet.

FIG. 5 is a perspective view illustrating a state of supporting the light guide plate 13 by the pillar 2c, the elastic member 6, and the feet 2f. In FIG. 5, the portions indicated by large dashed circles are partial enlarged views of the portions indicated by small dashed circles connected to the large dashed circles by the dashed lines. When an original coordinate axis is not illustrated, FIG. 5 uses the same coordinate axis of a basic perspective view. When an original coordinate axis is illustrated, the illustration is viewed from a different angle along the coordinate axis.

In FIG. 5, the groove 13c of the light guide plate 13 engages with the pillar 2c substantially at the center of the bottom frame 2 at the light incident side. Further, the non-light incident side of the light guide plate 13 is supported such that the side surface is pressed by the elastic member 6. In this way, the light guide plate 13 can be stably supported by three points of the pillar 2c and the elastic member 6. Even with a long side at the light incident side, generation of rattle noise can be effectively prevented by support of the light guide plate 13 by the elastic member 6. Note that, when the side of the light guide plate 13 at the light incident side is long, a clearance in a long-side direction is great, and absorption of expansion and contraction by the elastic member 6 is difficult. However, movement of the light guide plate 13 in the long-side direction is restricted by the pillar 2c, and the elastic member 6 need only restrict movement in the light guide direction with a small clearance, and can thus stably support the light guide plate 13. Since the elastic member 6 is sandwiched by the light guide plate 13, the elastic member 6 can be prevented from popping out and can stably support the light guide plate 13.

Further, at a position at the light incident side of the bottom frame 2 opposite to the elastic member 6, the feet 2f are in contact with and support a light incident side surface 13b of the light guide plate 13. In this way, the light guide plate 13 can be prevented from rotating like a seesaw with the pillar 2c as a fulcrum.

Figure 6:
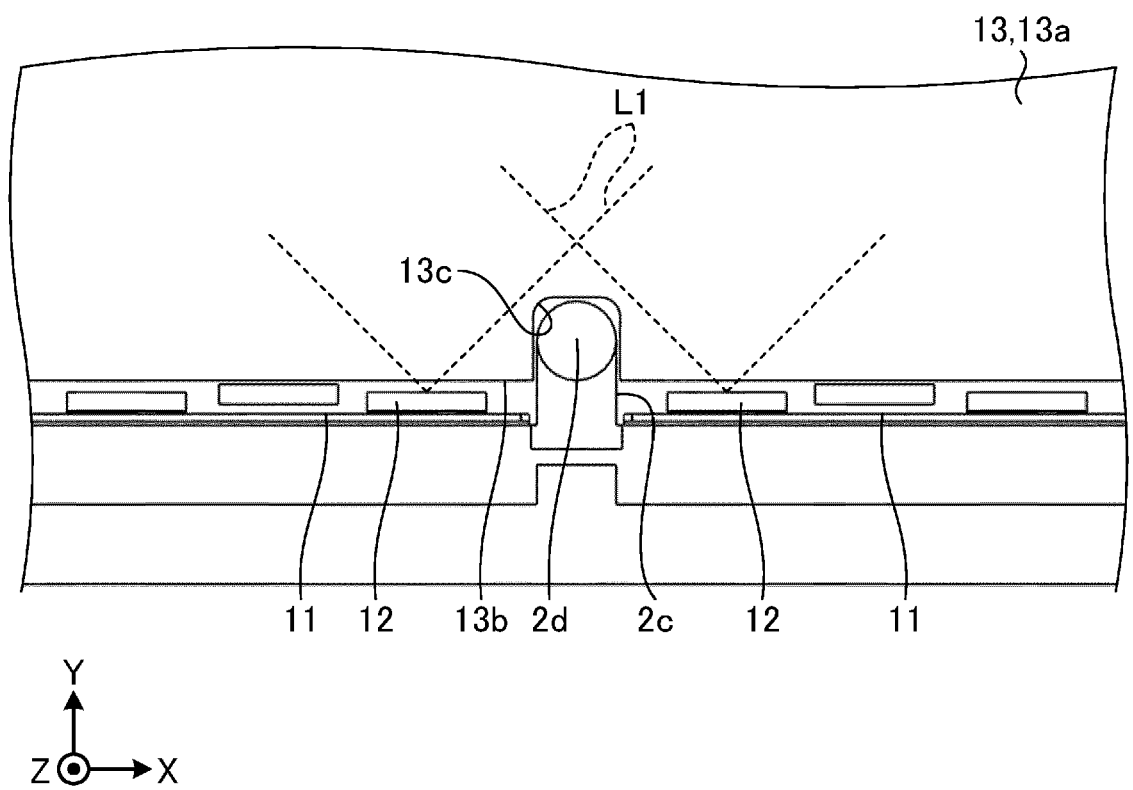
FIG. 6 is a diagram illustrating an example of a positional relationship between a groove of the light guide plate, the pillar of the bottom frame, and light emitted from a light source.

FIG. 6 is a diagram illustrating an example of a positional relationship between the groove 13c of the light guide plate 13, the pillar 2c of the bottom frame 2, and light emitted from the light source 12. In FIG. 6, a depth of the groove 13c of the light guide plate 13 in the light guide direction from the light incident side surface 13b is set to a length long enough to not impede a light L1 at the farthest end emitted from a center portion of the light source 12 adjacent to the groove 13c. With this configuration, the influence of the groove 13c of the light guide plate 13 on optical characteristics can be reduced.

The pillar 2c has a substantially rectangular shape without corners at the light guide plate 13 side in a plan view. The groove 13c has a substantially rectangular shape without corners at the depth side in the plan view. With this configuration, the pillar 2c and the groove 13c can smoothly engage with each other, and stable support can be achieved due to the presence of the linearly contact portions.

Figure 7:
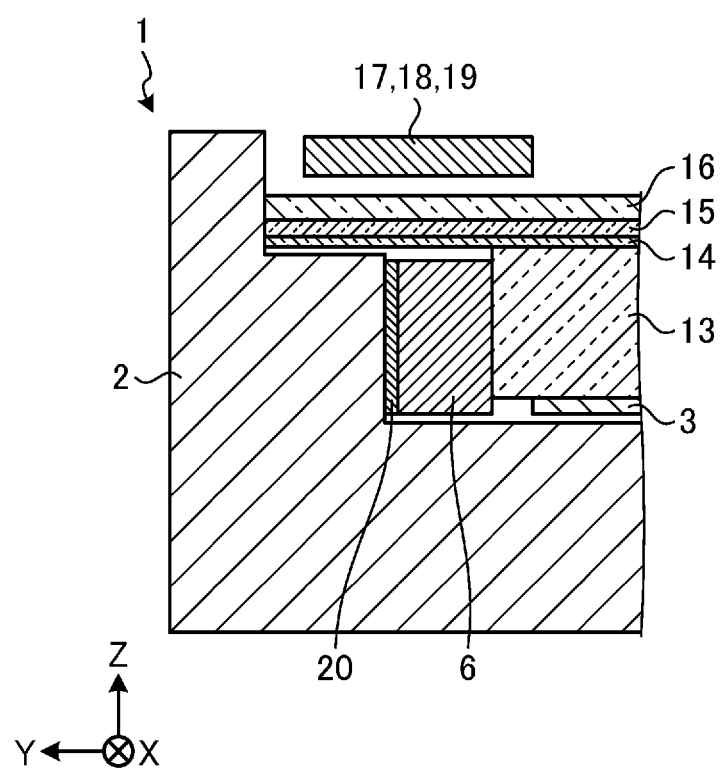
FIG. 7 is an end view illustrating another configuration example of the elastic member according to the embodiment.

FIG. 7 is an end view illustrating another configuration example of the elastic member 6 according to the embodiment. In FIG. 7, the elastic member 6 such as plate rubber is fixed to the inside of the side wall of the bottom frame 2 by a double-sided tape 20, and a non-fixed side of the elastic member 6 presses the side surface of the light guide plate 13 at the non-light incident side. Since the elastic member 6 presses the light guide plate 13 in a short-side direction, the clearance does not become excessive even with the planar illumination device 1 having an increased horizontal length, and expansion and contraction of the light guide plate 13 due to a change in temperature can be absorbed.

Figure 8:
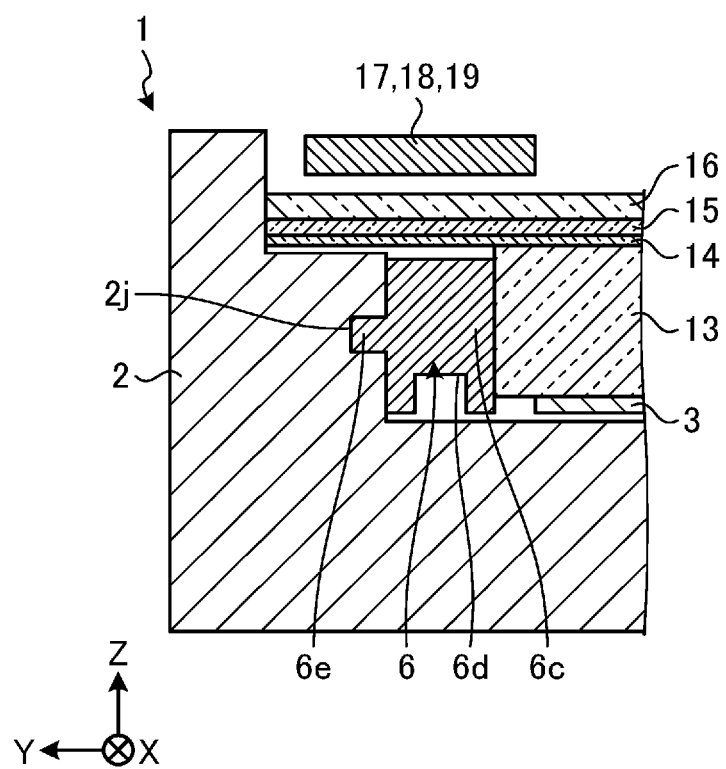
FIG. 8 is an end view illustrating another configuration example of the elastic member according to the embodiment.

FIG. 8 is an end view illustrating another configuration example of the elastic member 6 according to the embodiment. In FIG. 8, the elastic member 6 is formed of synthetic rubber or the like, and includes a main body portion 6c having a substantially cuboid shape, a relief portion 6d formed partway along a side surface of the main body portion 6c at a non-pressing side, and a protruding portion 6e provided on one side surface of the main body portion 6c at a pressing side. The protruding portion 6e engages with a recess portion 2j formed in the side wall of the bottom frame 2. Since it is difficult to bond synthetic rubber using double-sided tape, the elastic member 6 is prevented from popping out by the engagement between the protruding portion 6e and the recess portion 2j. A surface of the elastic member 6 at an opposite side to the surface provided with the protruding portion 6e presses the side surface of the light guide plate 13 at the non-light incident side. In this way, the elastic member 6 can be prevented from popping out, and the light guide plate 13 can be stably supported.

Figure 9:
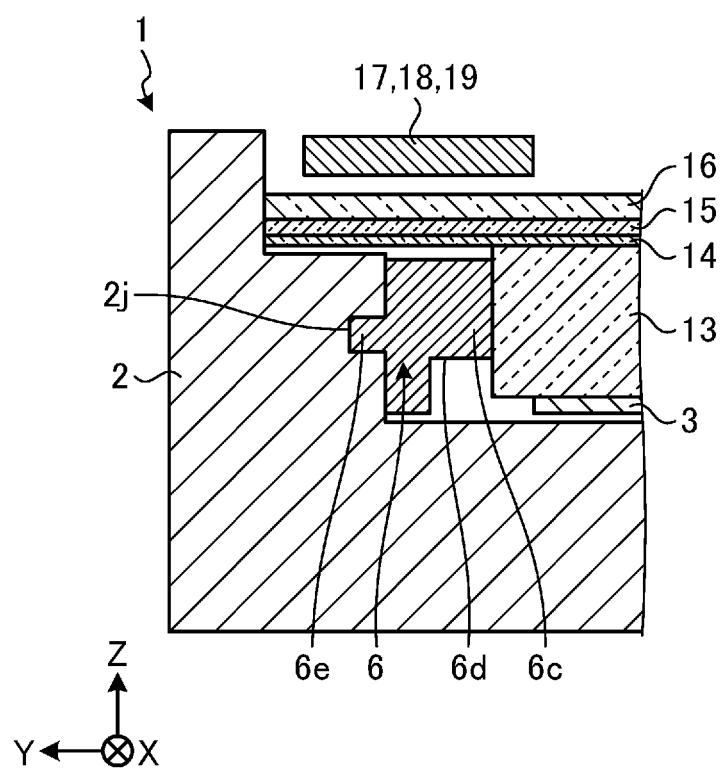
FIG. 9 is an end view illustrating another configuration example of the elastic member according to the embodiment.

FIG. 9 is an end view illustrating another configuration example of the elastic member 6 according to the embodiment. In FIG. 9, the relief portion 6d of the elastic member 6 in FIG. 8 is formed at a different position. In FIG. 8, the relief portion 6d is formed partway along the side surface of the main body portion 6c at the non-pressing side. However, in FIG. 9, the relief portion 6d is formed from a substantially center portion to an end portion at the light guide plate 13 side of the side surface of the main body portion 6c at the non-pressing side. The effect of the elastic member 6 in FIG. 9 is similar to that in FIG. 8.

Figure 10:
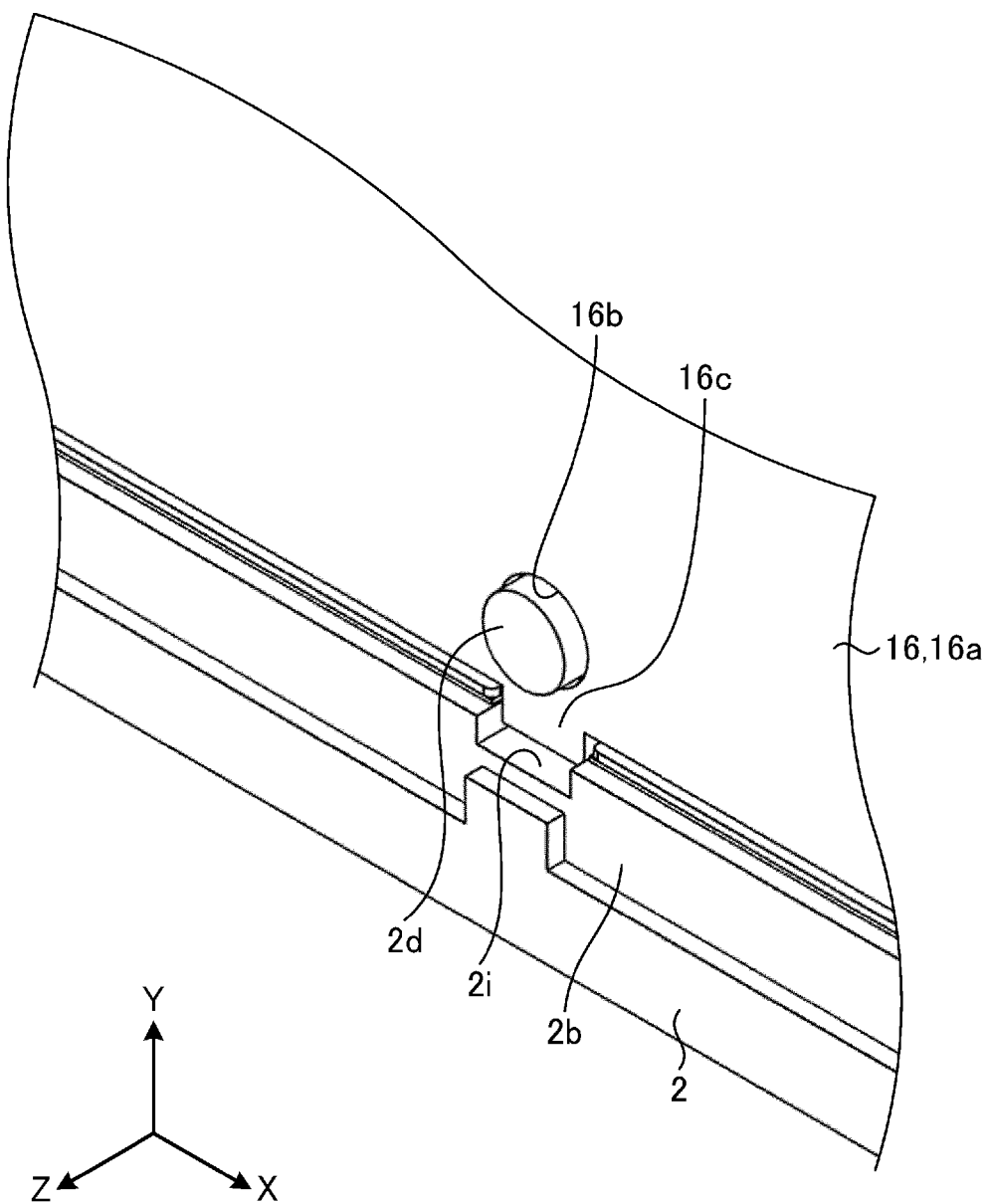
FIG. 10 is a perspective view illustrating an example of fixing of an optical sheet by a pin.

FIG. 10 is a perspective view illustrating an example of fixing the optical sheet 16 by the pin 2d. In FIG. 10, a hole 16b formed in a main surface 16a of the optical sheet 16 at the light incident side engages with the pin 2d protruding from the bottom frame 2. Note that an ear portion 16c is provided outside the hole 16b of the optical sheet 16, and engages with a recess portion 2i formed in the side wall 2b of the bottom frame 2.

Further, an end portion of the optical sheet 16 at the light incident side is provided so as to oppose, via a minimum clearance, the substrate 11 including the light sources 12. In this way, the end portion of the optical sheet 16 at the light incident side may come into contact with the substrate 11, but does not come into direct contact with the bottom frame 2, and thus generation of rattle noise can be suppressed. This is because the substrate 11 acts as a cushioning material. The structure employed for fixing the optical sheet 16 described above is also similar to that for the optical sheet 15 and the optical sheet 14 disposed at the rear side of the optical sheet 16.

Figure 11:
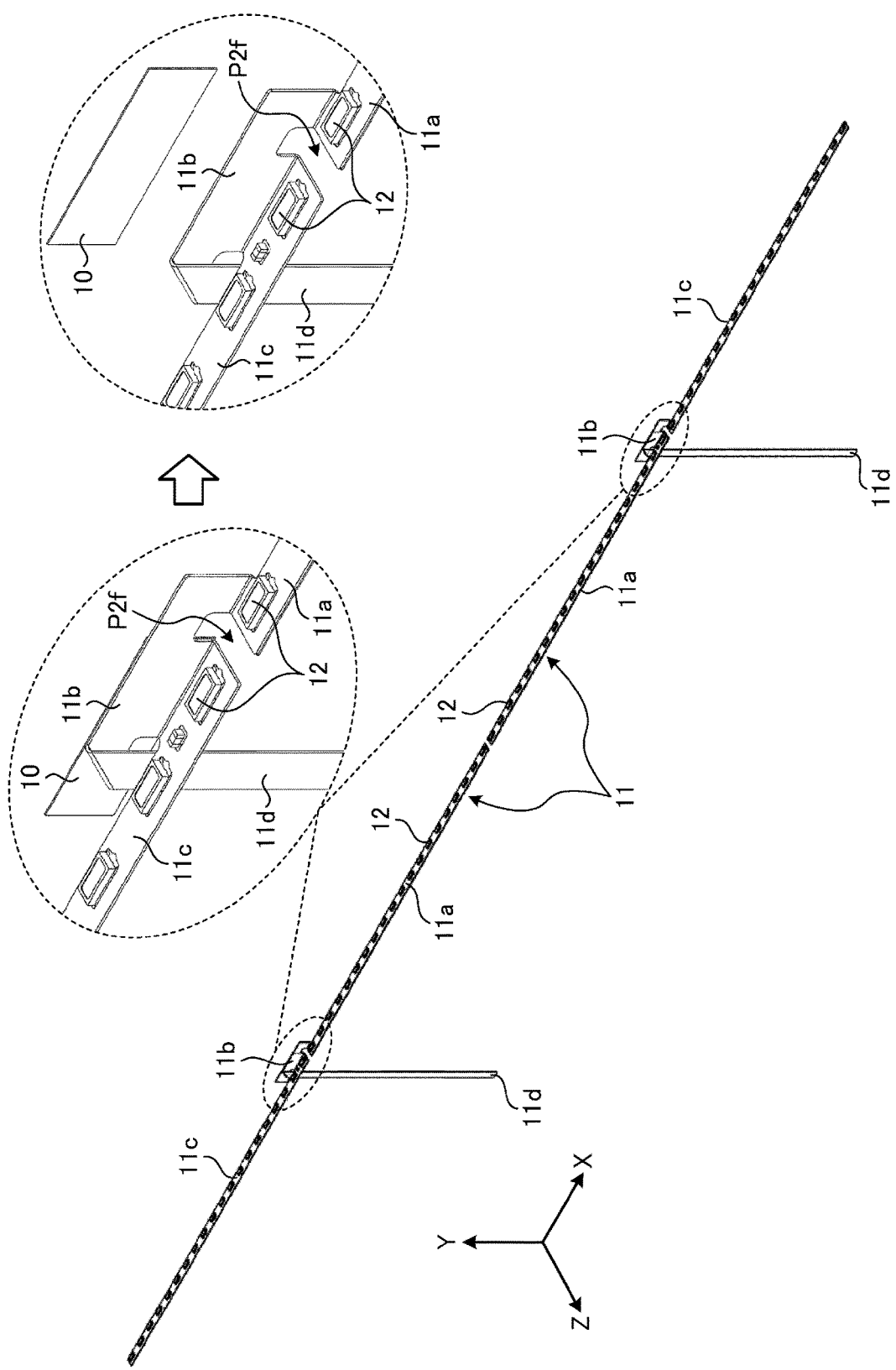
FIG. 11 is a perspective view illustrating a configuration example of a substrate including the light sources.

FIG. 11 is a perspective view illustrating a configuration example of the substrate 11 including the light sources 12. In FIG. 11, the portions indicated by large dashed circles are partial enlarged views of the portions indicated by small dashed circles connected to the large dashed circles by dashed lines, and is an illustration viewed from the same angle as that in a coordinate axis of a basic perspective view.

In FIG. 11, two sets of the substrates 11 including the plurality of light sources 12 are provided on the left and right in the longitudinal direction. The substrate 11 including the plurality of light sources 12 is strip-like. A light source placement portion 11a and a light source placement portion 11c, both being strip-like, bypass the foot 2f due to the coupling portion 11b at a portion P2f provided with the foot 2f (FIG. 5). The coupling portion 11b is integrally formed with the light source placement portion 11a and the coupling portion 11b is formed by being bent at a right angle. Furthermore, one end of the coupling portion 11b is bent and drawn out as the connection portion 11d.

The substrate 11 is fixed to the inside of the side wall 2b of the bottom frame 2 at the light incident side, and the coupling portion 11b is fixed to the bottom portion 2a of the bottom frame 2. A rear surface of the coupling portion 11b is fixed to the inside of the bottom portion 2a of the bottom frame 2 by the double-sided tape 10. In this way, the substrate 11 can be prevented from being pressed by the feet 2f, and can be prevented from peeling and the like. Further, the feet 2f can be bypassed without increasing thickness.

Figure 12:
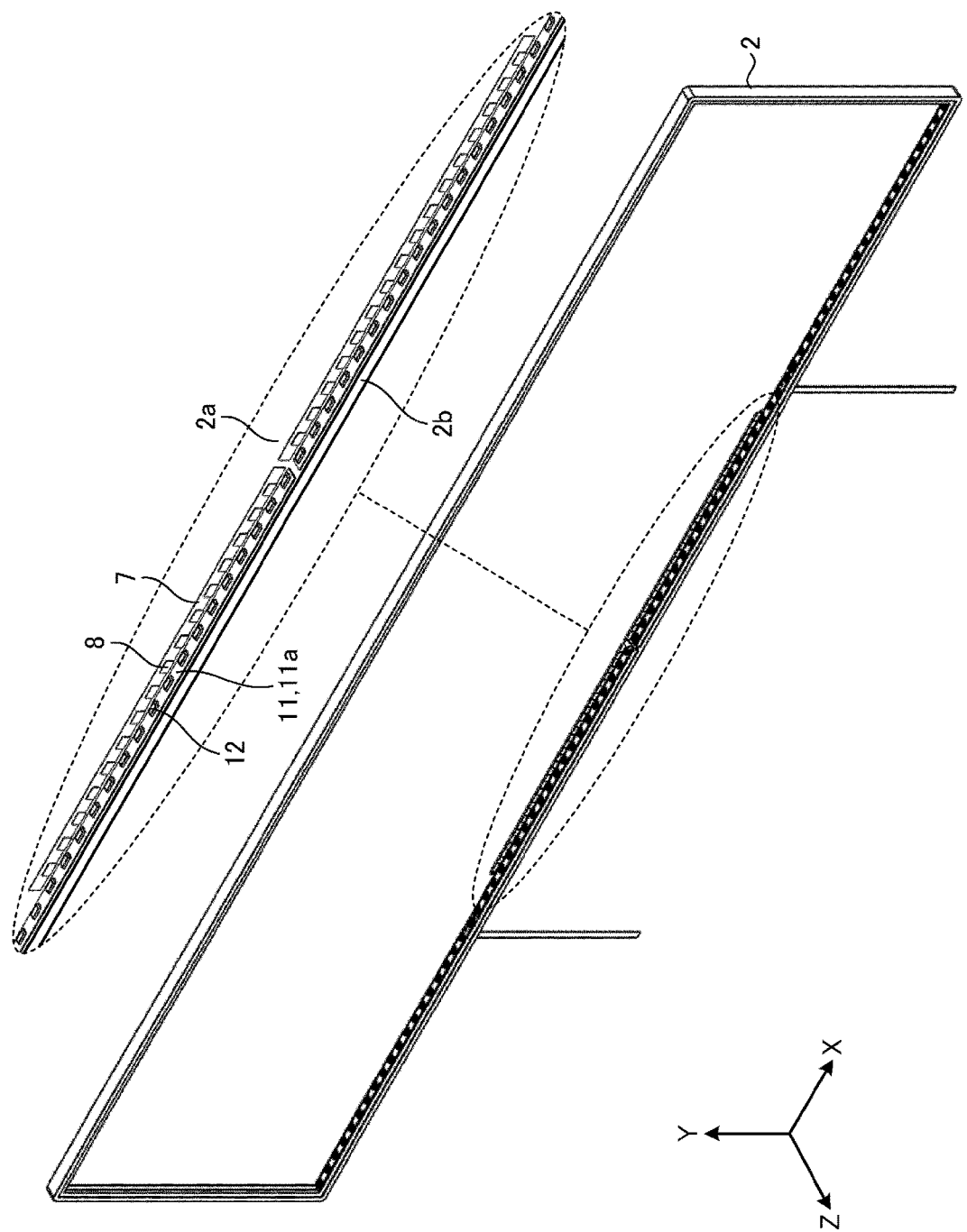
FIG. 12 is a perspective view illustrating a configuration example of a double-sided tape for fixing the light guide plate at a center portion of a long side at a light incident side.

FIG. 12 is a perspective view illustrating a configuration example of the double-sided tapes 7 and 8 for fixing the light guide plate 13 at a center portion of a long side at the light incident side. In FIG. 12, the portion indicated by the large dashed circle is a partially enlarged view of the portion indicated by the small dashed circle connected to the large dashed circle by a dashed line, and is an illustration viewed from the same angle as that in a coordinate axis of a basic perspective view.

In FIG. 12, the end portion at the light incident side of the main surface of the light guide plate 13 at the non-light exit side is fixed to the bottom portion 2a of the bottom frame 2 in a predetermined range substantially at the center in the longitudinal direction at the light incident side by the strip-like double-sided tape 7 and the double-sided tape 8 disposed in island shapes between the plurality of light sources 12 on the substrate 11. With this configuration, optical axes in the thickness direction of the light incident side surface 13b of the light guide plate 13 and the light source 12 can be accurately positioned, and a crack can also be prevented from being generated in the light guide plate 13 due to engagement between the groove 13c of the light guide plate 13 and the pillar 2c of the bottom frame 2. Note that, by limiting the range fixed by the double-sided tapes 7 and 8 to the predetermined range substantially at the center in the longitudinal direction at the light incident side, peeling of the double-sided tapes 7 and 8 because of expansion and contraction due to a change in temperature in the light guide plate 13 does not occur.

Embodiments of the present disclosure have been described above, but the present disclosure is not limited to the embodiments described above, and various modifications are possible without departing from the spirit of the present disclosure.

As described above, a planar illumination device according to the embodiment includes: a light guide plate configured to receive light from a light incident side surface; a plurality of light sources configured to emit light to the light incident side surface of the light guide plate; an elastic member configured to press and support the light guide plate; and a bottom frame configured to house the light guide plate, the plurality of light sources, and the elastic member, wherein the bottom frame includes a pillar configured to protrude in a thickness direction at a position opposing substantially a center of the light incident side surface of the light guide plate in a longitudinal direction, the light guide plate includes, substantially at the center of the light incident side surface in the longitudinal direction, a groove configured to engage with the pillar, and the elastic member presses a side of the light guide plate at a non-light incident side toward a light incident side. In this way, even in a configuration having a long side at the light incident side, generation of rattle noise can be effectively prevented by support of the light guide plate with the elastic member.

Further, the pillar is connected to the side wall of the bottom frame at the light incident side, and protrudes in the thickness direction from a bottom portion of the bottom frame. With this configuration, the strength of the pillar can be increased, and the light guide plate can be stably supported.

Further, the pillar has a substantially rectangular shape without corners at the light guide plate side in a plan view, and the groove has a substantially rectangular shape without corners at a depth side in the plan view. With this configuration, the pillar and the groove can smoothly engage with each other, and stable support can be achieved due to the presence of the linearly contact portions.

Further, a depth of the groove in a light guide direction from the light incident side surface of the light guide plate is set to a length long enough to not impede light emitted from a center portion of each of the light sources adjacent to the groove. With this configuration, the influence of the groove of the light guide plate on optical characteristics can be reduced.

Further, the elastic member is disposed between a side of the light guide plate at the non-light incident side and the side wall of the bottom frame. With this configuration, the light guide plate can be stably supported. When the side of the light guide plate at the light incident side is long, a clearance in a long-side direction is great, and absorption of expansion and contraction by the elastic member is difficult. However, movement of the light guide plate in the long-side direction is restricted by the pillar, and the elastic member need only restrict movement in the light guide direction with a small clearance, and can thus stably support the light guide plate.

Further, the elastic member is disposed at two positions symmetrical with respect to substantially the center of a side of the light guide plate at the non-light incident side. With this configuration, the light guide plate can be stably supported by three points of the pillar and the elastic member.

Further, the elastic member is formed of molded rubber, and includes a flat portion having a substantially rectangular shape and a bent portion having a substantially rectangular shape and being provided upright at a right angle from one side of the flat portion, and the flat portion is disposed between a main surface of the light guide plate at a non-light exit side and the bottom portion of the bottom frame, and the bent portion is disposed between the side of the light guide plate at the non-light incident side and the side wall of the bottom frame. With this configuration, the elastic member can be prevented from popping out, and the light guide plate can be stably supported.

Further, the elastic member includes a relief portion formed in a side surface of the main body portion at a non-pressing side, and a protruding portion provided on one side surface of the main body portion at a pressing side, the protruding portion engages with a recess portion formed in the side wall of the bottom frame, and a surface at an opposite side to the surface provided with the protruding portion presses the side surface of the light guide plate at the non-light incident side. With this configuration, the elastic member can be prevented from popping out, and the light guide plate can be stably supported.

Further, the planar illumination device includes a plurality of feet configured to protrude from the side wall of the bottom frame opposing a side of the light guide plate at the light incident side toward the light guide plate. With this configuration, the light guide plate can be prevented from rotating like a seesaw with the pillar as a fulcrum.

Further, the planar illumination device includes a plurality of feet configured to protrude from the light incident side surface of the light guide plate toward the side wall of the bottom frame. With this configuration, the light guide plate can be prevented from rotating like a seesaw with the pillar as a fulcrum.

Further, a substrate including the plurality of light sources is strip-like, and bypasses each of the feet due to a coupling portion at a portion provided with the foot. With this configuration, the substrate can be prevented from being pressed by the feet, and can be prevented from peeling and the like.

Further, the substrate is fixed to an inside of the side wall of the bottom frame at the light incident side, and the coupling portion is fixed to the bottom portion of the bottom frame. With this configuration, the feet can be bypassed without increasing thickness.

Further, the planar illumination device includes a pin provided so as to protrude from the pillar in a light exit direction, wherein a hole provided in an optical sheet at the light incident side engages with the pin. With this configuration, the optical sheet can be easily fixed, and frame narrowing can be achieved since another region for fixing the optical sheet does not need to be secured.

Further, an end portion of the optical sheet at the light incident side is provided so as to oppose, via a minimum clearance, the substrate including the light sources. With this configuration, the optical sheet may come into contact with the substrate, but does not come into direct contact with the bottom frame, and thus generation of rattle noise can be suppressed.

Further, an end portion at the light incident side of the main surface of the light guide plate at the non-light exit side is fixed to the bottom portion of the bottom frame in a predetermined range substantially at the center in the longitudinal direction of the light incident side surface by a double-sided tape disposed in island shapes between the plurality of light sources. With this configuration, optical axes in the thickness direction of the light incident side surface of the light guide plate and the light source can be accurately positioned, and a crack can also be prevented from being generated in the light guide plate due to engagement between the groove of the light guide plate and the pillar of the bottom frame.

Moreover, the present disclosure is not limited to the embodiment described above. A configuration obtained by appropriately combining the above-mentioned constituent elements is also included in the present disclosure. Further effects and modifications can be easily derived by a person skilled in the art. Thus, a wide range of aspects of the present disclosure is not limited to the embodiment described above, and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device, comprising:
  a light guide plate configured to receive light from a light incident side surface;
  a plurality of light sources configured to emit light to the light incident side surface of the light guide plate;
  an elastic member configured to press and support the light guide plate; and
  a bottom frame configured to house the light guide plate, the plurality of light sources, and the elastic member, wherein
  the bottom frame includes a pillar configured to protrude in a thickness direction at a position opposing substantially at a center of the light incident side surface of the light guide plate in a longitudinal direction,
  the light guide plate includes, substantially at the center of the light incident side surface in the longitudinal direction, a groove configured to engage with the pillar, and
  the elastic member presses a side of the light guide plate at a non-light incident side toward a light incident side.

2. The planar illumination device according to claim 1, wherein
  the pillar is connected to a side wall of the bottom frame at the light incident side, and protrudes in the thickness direction from a bottom portion of the bottom frame.

3. The planar illumination device according to claim 1, wherein
the pillar has a substantially rectangular shape without corners at the light guide plate side in a plan view, and
the groove has a substantially rectangular shape without corners at a depth side in the plan view.

4. The planar illumination device according to claim 1, wherein
a depth of the groove in a light guide direction from the light incident side surface of the light guide plate is set to a length long enough to not impede light emitted from a center portion of each of the light sources adjacent to the groove.

5. The planar illumination device according to claim 1, wherein
the elastic member is disposed between a side of the light guide plate at the non-light incident side and the side wall of the bottom frame.

6. The planar illumination device according to claim 1, wherein
the elastic member is disposed at two positions symmetrical with respect to substantially the center of a side of the light guide plate at the non-light incident side.

7. The planar illumination device according to claim 1, wherein
the elastic member is formed of molded rubber, and includes a flat portion having a substantially rectangular shape and a bent portion having a substantially rectangular shape and being provided upright at a right angle from one side of the flat portion, and
the flat portion is disposed between a main surface of the light guide plate at a non-light exit side and the bottom portion of the bottom frame, and the bent portion is disposed between the side of the light guide plate at the non-light incident side and the side wall of the bottom frame.

8. The planar illumination device according to claim 1, wherein
the elastic member is formed of molded rubber, and includes a main body portion having a substantially cuboid shape, a relief portion formed partway along a side surface of the main body portion at a non-pressing side, and a protruding portion provided on one side surface of the main body portion at a pressing side,
the protruding portion engages with a recess portion formed in the side wall of the bottom frame, and
a surface at an opposite side to the surface provided with the protruding portion presses the side surface of the light guide plate at the non-light incident side.

9. The planar illumination device according to claim 1, further comprising
a plurality of feet configured to protrude from the side wall of the bottom frame opposing a side of the light guide plate at the light incident side toward the light guide plate.

10. The planar illumination device according to claim 1, further comprising
a plurality of feet configured to protrude from the light incident side surface of the light guide plate toward the side wall of the bottom frame.

11. The planar illumination device according to claim 9, wherein
a substrate including the plurality of light sources is strip-like, and bypasses each of the feet due to a coupling portion at a portion provided with the foot.

12. The planar illumination device according to claim 11, wherein
the substrate is fixed to an inside of the side wall of the bottom frame at the light incident side, and the coupling portion is fixed to the bottom portion of the bottom frame.

13. The planar illumination device according to claim 1, further comprising
a pin provided so as to protrude from the pillar in a light exit direction, wherein
a hole provided in an optical sheet at the light incident side engages with the pin.

14. The planar illumination device according to claim 13, wherein
an end portion of the optical sheet at the light incident side is provided so as to oppose, via a minimum clearance, the substrate including the light sources.

15. The planar illumination device according to claim 1, wherein
an end portion at the light incident side of the main surface of the light guide plate at the non-light exit side is fixed to the bottom portion of the bottom frame in a predetermined range substantially at the center of the light incident side surface in the longitudinal direction by double-sided tape disposed in island shapes between the plurality of light sources.

* * * * *